United States Patent
Apostolo

[19]
[11] Patent Number: 6,146,296
[45] Date of Patent: Nov. 14, 2000

[54] MULTIPLE SPEED TRANSMISSION FOR CONNECTING AN AIR CONDITIONER COMPRESSOR OF A VEHICLE TO THE ENGINE OF THE VEHICLE

[76] Inventor: Mauricio C. Apostolo, 5711 SW. 88th St., Miami, Fla. 33156

[21] Appl. No.: 09/203,891

[22] Filed: Dec. 2, 1998

[51] Int. Cl.⁷ .............. F16H 9/00; F16H 7/00; F16H 7/24; F16D 13/68
[52] U.S. Cl. .............. 474/73; 474/88; 474/150; 192/115
[58] Field of Search .............. 180/292, 293, 180/312; 248/200; 192/115, 48.2; 474/69, 70, 73, 74, 84, 88, 148, 150, 273

[56] References Cited

U.S. PATENT DOCUMENTS

| | | | |
|---|---|---|---|
| 2,068,331 | 1/1937 | Katzman | 192/17 |
| 2,828,845 | 4/1958 | Thornton | 474/73 |
| 3,203,279 | 8/1965 | Rahrig et al. | 474/73 |
| 3,583,242 | 6/1971 | Thornbloom | 474/73 |
| 4,216,678 | 8/1980 | Butterfield et al. | 474/12 |
| 4,360,353 | 11/1982 | Hattori et al. | 474/12 |
| 4,373,927 | 2/1983 | McKinley | 474/74 |
| 4,560,371 | 12/1985 | Hattori | 474/201 |
| 4,601,378 | 7/1986 | Pierce et al. | 192/115 |
| 4,721,494 | 1/1988 | Hayashi et al. | 474/88 |
| 4,728,315 | 3/1988 | Schlagmüller | 474/13 |
| 4,830,165 | 5/1989 | Guslits et al. | 192/110 R |
| 4,946,016 | 8/1990 | Torres | 192/48.2 |
| 5,007,882 | 4/1991 | Mizumoto et al. | 474/84 |
| 5,156,573 | 10/1992 | Bytzek et al. | 474/74 |
| 5,217,412 | 6/1993 | Indlekofer et al. | 474/69 |
| 5,277,270 | 1/1994 | Hasegawa | 180/378 |
| 5,310,034 | 5/1994 | Bernabei | 192/115 |
| 5,334,105 | 8/1994 | Wang | 474/84 |
| 5,485,904 | 1/1996 | Organek et al. | 192/35 |
| 5,832,703 | 11/1998 | Evans | 474/88 |
| 5,909,075 | 6/1999 | Heimark | 310/103 |

FOREIGN PATENT DOCUMENTS

| | | | |
|---|---|---|---|
| 405306740 | 11/1993 | Japan | 474/150 |

*Primary Examiner*—David A. Bucci
*Assistant Examiner*—Matthew A. Kaness
*Attorney, Agent, or Firm*—Richard L. Miller

[57] ABSTRACT

A multiple speed transmission for connecting an air conditioner compressor of an automobile to a prime mover of the automobile. The transmission includes driving apparatus, driven apparatus, and mounting apparatus. The driving apparatus operatively connects to the prime mover of the automobile. The driven apparatus is operatively connected to the driving apparatus for operatively connecting to the air conditioner compressor of the automobile. The mounting apparatus mounts the driving apparatus and the driven apparatus to the prime mover of the automobile. When the air conditioner thermostat engages the air conditioner clutch, a RPM control box of the driving apparatus interchangeably engages a first clutch of the driving apparatus and a second clutch of the driving apparatus, based on the RPM of the prime mover of the automobile, to assure that the required RPM of the shaft of the air conditioner compressor of the automobile is continuously maintained, regardless of the RPM of the prime mover of the automobile.

5 Claims, 1 Drawing Sheet

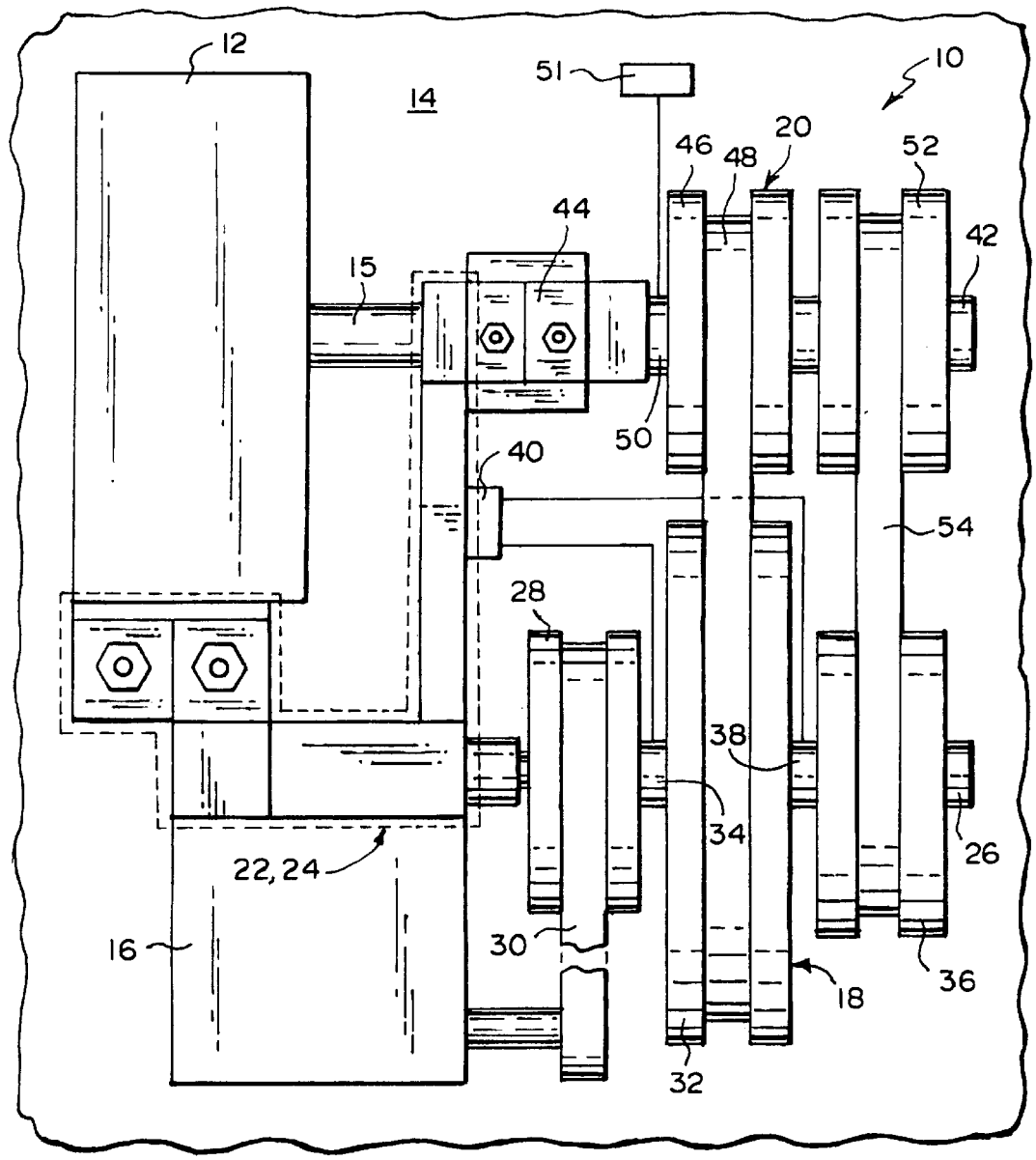

MULTIPLE SPEED TRANSMISSION FOR CONNECTING AN AIR CONDITIONER COMPRESSOR OF A VEHICLE TO THE ENGINE OF THE VEHICLE

BACKGROUND OF THE INVENTION

1. Field of the Invention

The present invention relates to a multiple speed transmission. More particularly, the present invention relates to a multiple speed transmission for connecting an air conditioner compressor of an automobile to a prime mover of the automobile.

2. Description of the Prior Art

Numerous innovations for transmissions have been provide in the prior art that will be described. Even though these innovations may be suitable for the specific individual purposes to which they address, however, they differ from the present invention.

A FIRST EXAMPLE, U.S. Pat No. 4,216,678 to Butterfield et al. teaches a drive system especially adapted for driving accessories associated with the engine of a vehicle and controlled essentially by the speed of the engine crankshaft. The drive system comprises a pair of variable pulleys interconnected by a flexible belt, one pulley being driven from the engine crankshaft and the other pulley being associated with one or more accessories.

A SECOND EXAMPLE, U.S. Pat. No. 4,360,353 to Hattori et al. teaches a torque transmission system that has driving and driven pulley units drivingly connected by an endless V-belt. Each of the driving and driven pulley units includes a stationary pulley rotatable with a shaft and a movable pulley disposed to define with the stationary pulley a circumferential continuous groove for receiving the V-belt. The movable pulleys of the driving and driven pulley units are axially resiliently biased so that the radii of the circles along which the V-belt engages the driving pulley units are varied to change the speed-change ratio of the transmission system. The movable pulley of the driven pulley unit is axially shifted by fly weights. The driving and driven pulley units are provided with cam mechanisms each comprising a cam member and a follower member. When the load on the driven pulley unit is suddenly varied, the cam mechanism are operative to keep constant the rotational speed of the driven pulley unit irrespective of various in the load on the driven pulley unit.

A THIRD EXAMPLE, U.S. Pat. No. 4,560,371 to Hattori teaches a V-belt transmission which comprises V-groove pulleys and an endless belt surrounding the pulleys. A plurality of V-shaped belt engaging metallic members are positioned along the endless belt in the longitudinal direction thereof, each having a belt engaging surface for engaging the belt. A plurality of intermediate members are positioned between adjacent engaging members, with the intermediate members being positioned on the inside of the endless belt. Each of the engaging members includes a receiving surface for contacting the adjacent intermediate member, with at least one of the receiving surfaces being shaped to apply a force to the intermediate member in the longitudinal direction of the belt when the engaging member is brought into contact with the V-groove of the V-groove pulleys. The belt engaging surface of the engaging member is aligned with the mid-point of the height of the inclined side surfaces thereof which contact the V-groove of the V-groove pulleys. Further, the transmission includes resilient stopper member which hold the endless belt in a groove in the engaging member. The resilient stopper members have a size such that they contact adjacent stopper members in the longitudinal direction of the belt.

A FOURTH EXAMPLE, U.S. Pat. No. 4,721,494 to Hayashi et al. teaches a drive transmission structure for a tractor comprising a belt drive system for transmitting power from an engine output shaft to a transmission having a brake mechanism. The belt drive system includes a belt type stepless change speed mechanism having a split pulley assembly and a swing device for swinging the split pulley assembly toward the engine output shaft and the transmission, a first belt for transmitting the power from the engine output shaft to the split pulley assembly, and a second belt for transmitting the power from the split pulley assembly to the transmission. The pulley assembly defines two split pulley sections for engaging the first and second belts, respectively. A control device is provided to change power transmission ratios by actuating the swing device. Further, a tension pulley type clutch mechanism is provided to act on the first belt or the second belt. The brake mechanism and the tension pulley type clutch mechanism are controlled by the clutch and brake control mechanism.

A FIFTH EXAMPLE, U.S. Pat. No. 4,728,315 to Schlagmuller teaches a two-speed drive for a generator of an internal combustion engine that includes two belt pulleys and centrifugal type friction-clutch coupling. The coupling has an actuating lever formed as a flyweight and pivotally supported against the force of a spring on a pin connected either to the belt pulley of a smaller diameter or to the generator or to the generator fan. The coupling can be mounted either to the driven side of the generator or to its driving side. A coupling jaw pivotally supported on the actuating lever cooperates with a friction surface provided on the housing of the coupling. An angle formed between the direction of action of the resulting normal force acting on the coupling jaw and the line between the pivot point of the lever and the pivot point of the coupling jaw corresponds to a friction angle at static friction.

A SIXTH EXAMPLE, U.S. Pat. No. 5,007,882 to Mizumoto et al. teaches a belt transmission for a very small size shovel car which improves the starting performance of an engine for the shovel car to permit employment as such engine of a small size engine having a low output power. The belt transmission comprises a first pulley mounted on an output shaft of the engine, second and third pulleys mounted commonly on an input shaft of a transmission case of the shovel car, a first belt extending between and around the first and second pulleys, a belt tension clutch movable to and from an operative position in which it engages with the first belt to cause the first belt to transmit power from the first pulley to the second pulley, a fourth pulley mounted on an input shaft of a hydraulic pump of the shovel car, and a second belt extending between and around the third and fourth pulleys. When the belt tension clutch is in the operative position, power of the engine is transmitted to the second pulley to operate both of the transmission case and the hydraulic pump, but when the belt tension clutch is not in the operative position, no power is transmitted to the second pulley and neither of the transmission case and the hydraulic pump is operated.

It is apparent that numerous innovations for transmissions have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a multiple speed transmission for connecting an air conditioner compressor of an automobile to a prime mover of the automobile that avoids the disadvantages of the prior art.

ANOTHER OBJECT of the present invention is to provide a multiple speed transmission for connecting an air conditioner compressor of an automobile to a prime mover of the automobile that is simple and inexpensive to manufacture.

STILL ANOTHER OBJECT of the present invention is to provide a multiple speed transmission for connecting an air conditioner compressor of an automobile to a prime mover of the automobile that is simple to use.

BRIEFLY STATE, YET ANOTHER OBJECT of the present invention is to provide a multiple speed transmission for connecting an air conditioner compressor of an automobile to a prime mover of the automobile. The transmission includes driving apparatus, driven apparatus, and mounting apparatus. The driving apparatus operatively connects to the prime mover of the automobile. The driven apparatus is operatively connected to the driving apparatus for operatively connecting to the air conditioner compressor of the automobile. The mounting apparatus mounts the driving apparatus and the driven apparatus to the prime mover of the automobile. When the air conditioner thermostat engages the air conditioner clutch, a RPM control box of the driving apparatus interchangeably engages a first clutch of the driving apparatus and a second clutch of the driving apparatus, based on the RPM of the prime mover of the automobile, to assure that the required RPM of the shaft of the air conditioner compressor of the automobile is continuously maintained, regardless of the RPM of the prime mover of the automobile.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole FIGURE of the drawing is a diagrammatic side elevational view of the present invention.

LIST OF REFERENCE NUMERALS UTILIZED
IN THE DRAWING 10 multiple speed transmission or connecting an air conditioner compressor of an automobile to a prime mover of the automobile of the present invention
12 air conditioner compressor of automobile 14
14 automobile
15 shaft of air conditioner compressor of automobile 14
16 prime mover of automobile 14
18 driving apparatus for operatively connecting to prime mover 16 of automobile 14
20 driven apparatus for operatively connecting to air conditioner compressor 12 of automobile 14
22 mounting apparatus
24 bracket of mounting apparatus 22 for rigid mounting to prime mover 16 of automobile 14 and for rotatably receiving shaft 15 of air conditioner compressor 12 of automobile 14
26 driving shaft of driving apparatus 18 for parallel disposition to shaft 15 of air conditioner compressor 12 of automobile 14
28 first drive pulley of driving apparatus 18 for operative connecting to prime mover 16 of automobile 14
30 drive belt of driving apparatus 18
32 second drive pulley of driving apparatus 18
34 first clutch of driving apparatus 18
36 third drive pulley of driving apparatus 18
38 second clutch of driving apparatus 18
40 RPM control box of driving apparatus 18
42 driven shaft of driven apparatus 20 for coaxial mounting to, and for rotation with, shaft 15 of air conditioner compressor 12 of automobile 14
44 coupling of driven apparatus 20
46 first driven pulley of driven apparatus 20
48 first driven belt of driven apparatus 20
50 air conditioner clutch for electrically connecting to, and activation by, air conditioner thermostat 51
51 air conditioner thermostat
52 second driven pulley of driven apparatus 20
54 second driven belt of driven apparatus 20

DETAILED DESCRIPTION OF THE
PREFERRED EMBODIMENT

Referring now to the sole FIGURE, the multiple speed transmission for connecting an air conditioner compressor of an automobile to a prime mover of the automobile of the present invention is shown generally at 10 for connecting an air conditioner compressor 12 of an automobile 14 to a prime mover 16 of the automobile 14, wherein the air conditioner compressor 12 of the automobile 14 has a shaft 15 with a required RPM and the prime mover 16 of the automobile has an RPM.

The multiple sped transmission for connecting an air conditioner compressor of an automobile to a prime mover of the automobile 10 comprises driving apparatus 18 for operatively connecting to the prime mover 16 of the automobile 14, driven apparatus 20 operatively connected to the driving apparatus 18 for operatively connecting to the air conditioner compressor 12 of the automobile 14, and mounting apparatus 22 for mounting the driving apparatus 18 and the driven apparatus 20 to the prime mover 16 of the automobile 14.

The mounting apparatus 22 comprises a bracket 24 for rigid mounting to the prime mover 16 of the automobile 14 and for rotatably receiving the shaft 15 of the air conditioner compressor 12 of the automobile 14.

The driving apparatus 18 comprises a driving shaft 26 that is rotatably mounted to the bracket 24 of the mounting apparatus 22 for parallel disposition to the shaft 15 of the air conditioner compressor 12 of the automobile 14.

The driving apparatus 18 further comprises a first drive pulley 28 that is mounted on the driving shaft 26 of the driving apparatus 18 for rotation therewith and for operative connecting to the prime mover 16 of the automobile 14 by a drive belt 30.

The driving apparatus 18 further comprises a second drive pulley 32 that is mounted on the driving shaft 26 of the driving apparatus 18, outboard of, and larger than, the first driving pulley 28 of the driving apparatus 18, and is selectively engaged with the driving shaft 26 of the driving apparatus 18 by a first clutch 34.

The driving apparatus 18 further comprises a third drive pulley 36 that is mounted on the driving shaft 26 of the driving apparatus 18, outboard of, and smaller than, the second driving pulley 32 of the driving apparatus 18, and is selectively engaged with the driving shaft 26 of the driving apparatus 18 by a second clutch 38.

The driving apparatus 18 further comprises a RPM control box 40 that is mounted on the bracket 24 of the mounting apparatus 22 and is in electrical communication with, and selectively engages one of, the first clutch 34 of the driving apparatus 18 and the second clutch 38 of the driving apparatus 18.

The driven apparatus 20 comprises a driven shaft 42 that is rotatably mounted to the bracket 24 of the mounting apparatus 22 for coaxial mounting to, and for rotation with, the shaft 15 of the air conditioner compressor 12 of the automobile 14 by a coupling 44.

The driven apparatus 20 further comprises a first driven pulley 46 that is mounted on the driven shaft 42 of the driven apparatus 20, in line with, smaller than, connected by a first driven belt 48 to, and for rotation with, the second drive pulley 32 of the driving apparatus 18, and for selective engagement with the driven shaft 42 of the driven apparatus 20 by an air conditioner clutch 50 for electrically connecting to, and activation by, an air conditioner thermostat 51.

The driven apparatus 20 further comprises a second driven pulley 52 that is mounted on the driven shaft 42 of the driven apparatus 20, outboard of, and same size as, the first driven pulley 46 of the driven apparatus 18, in line with, and connected by a second driven belt 54 to, for rotation with, the third drive pulley 36 of the driving apparatus 18, and for selective engagement with the driven shaft 42 of the driven apparatus 20 by the air conditioner clutch 50, and when the air conditioner thermostat 51 engages the air conditioner clutch, the RPM control box of the driving apparatus 18 interchangeably engages the first clutch 34 of the driving apparatus 18 and the second clutch 38 of the driving apparatus 18, based on the RPM of the prime mover 16 of the automobile 14, to assure that the required RPM of the shaft 15 of the air conditioner compressor 12 of the automobile 14 is continuously maintained, regardless of the RPM of the prime mover 16 of the automobile 14.

It will be understood that each of the elements described above, or two or more together, may also find a useful application in other types of constructions differing from the types described above.

While the invention has been illustrated and described as embodied in a multiple speed transmission for connecting an air conditioner compressor of an automobile to a prime mover of the automobile, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A multiple speed transmission for connecting an air conditioner compressor of an automobile to a prime mover of the automobile, wherein the air conditioner compressor of the automobile has a shaft with a RPM and the prime mover of the automobile has an RPM, said transmission comprising:
    a) driving apparatus for operatively connecting to the prime mover of the automobile;
    b) driven apparatus operatively connected to said driving apparatus for operatively connecting to the air conditioner compressor of the automobile; and
    c) mounting apparatus for mounting said driving apparatus and said driven apparatus to the prime mover of the automobile; said mounting apparatus comprising a bracket for rigid mounting to the prime mover of the automobile and for rotatably receiving the shaft of the air conditioner compressor of the automobile; said driving apparatus comprising:
        i) a driving shaft rotatably mounted to said bracket of said mounting apparatus for parallel disposition to the shaft of the air conditioner compressor of the automobile;
        ii) a first drive pulley mounted on said driving shaft of said driving apparatus for rotation therewith and for operative connecting to the prime mover of the automobile by a drive belt;
        iii) a second drive pulley mounted on said driving shaft of said driving apparatus, outboard of, and larger than, said first driving pulley of said driving apparatus, and being selectively engaged with said driving shaft of said driving apparatus by a first clutch; and
        iv) a third drive pulley mounted on said driving shaft of said driving apparatus, outboard of, and smaller than, said second driving pulley of said driving apparatus, and being selectively engaged with said driving shaft of said driving apparatus by a second clutch.

2. The transmission as defined in claim 1, wherein said driving apparatus further comprises a RPM control box that is mounted on said bracket of said mounting apparatus and is in electrical communication with, and selectively engages one of, said first clutch of said driving apparatus and said second clutch of said driving apparatus.

3. The transmission as defined in claim 2, wherein said driven apparatus comprises a driven shaft that is rotatably mounted to said bracket of said mounting apparatus for coaxial mounting to, and for rotation with, the shaft of the air conditioner compressor of the automobile by a coupling.

4. The transmission as defined in claim 3, wherein said driven apparatus further comprises a first driven pulley that is mounted on said driven shaft of said driven apparatus, in line with, smaller than, connected by a first driven belt to, and for rotation with, said second drive pulley of said driving apparatus, and for selectively engagement with said driven shaft of said driven apparatus by an air conditioner clutch for electrically connecting to, and activation by, an air conditioner thermostat.

5. The transmission as defined in claim 4, wherein said driven apparatus further comprises a second driven pulley that is mounted on said driven shaft of said driven apparatus, outboard of, and same size as, said first driven pulley of said driven apparatus, in line with, an connected by a second driven belt to, for rotation with, said third drive pulley of said driving apparatus, and for selective engagement with said driven shaft of said driven apparatus by the air conditioner clutch, and when the air conditioner thermostat engages the air conditioner clutch, said RPM control box of said driving apparatus interchangeably engages said first clutch of said driving apparatus and said second clutch of said driving apparatus based on the RPM of the prime mover of the automobile, to assure that the required RPM of the shaft of the air conditioner compressor of the automobile is continuously maintained, regardless of the RPM of the prime mover of the automobile.

* * * * *